(12) United States Patent
Seibert et al.

(10) Patent No.: US 8,864,324 B2
(45) Date of Patent: Oct. 21, 2014

(54) SUBSTRATE WITH LIGHTWEIGHT STRUCTURE

(75) Inventors: Volker Seibert, Hochheim (DE); Martin Schaefer, Mainz-Kostheim (DE); Thomas Westerhoff, Mainz (DE); Ralf Reiter, Mainz-Kastel (DE); Ralf Jedamzik, Griesheim (DE)

(73) Assignee: Schott AG, Mainz (DE)

( * ) Notice: Subject to any disclaimer, the term of this patent is extended or adjusted under 35 U.S.C. 154(b) by 25 days.

(21) Appl. No.: 13/353,648

(22) Filed: Jan. 19, 2012

(65) Prior Publication Data

US 2012/0182636 A1 Jul. 19, 2012

(30) Foreign Application Priority Data

Jan. 19, 2011 (DE) .......................... 10 2011 008 953

(51) Int. Cl.
*G02B 5/10* (2006.01)
*G02B 7/183* (2006.01)

(52) U.S. Cl.
CPC ..................... *G02B 7/183* (2013.01)
USPC ....................................................... 359/869

(58) Field of Classification Search
CPC .... G02B 23/00; G02B 23/16; G02B 26/0825; G02B 5/08; G02B 5/10; G02B 7/183; B60R 1/12; B60R 1/06; B60R 1/082

USPC .......... 359/399, 838, 846, 848, 869, 871, 883
See application file for complete search history.

(56) References Cited

U.S. PATENT DOCUMENTS 3,514,275 A * 5/1970 Bray .............................. 65/33.5
2010/0103546 A1* 4/2010 Schaefer et al. .............. 359/871
2010/0182711 A1* 7/2010 Westerhoff et al. ........... 359/883

FOREIGN PATENT DOCUMENTS

| DE | 102009005400 | 7/2010 |
|---|---|---|
| EP | 0395257 | 10/1990 |
| WO | 2006034775 | 4/2006 |

* cited by examiner

*Primary Examiner* — James Greece
*Assistant Examiner* — Jie Lei
(74) *Attorney, Agent, or Firm* — Ohlandt, Greeley, Ruggiero & Perle, LLP

(57) ABSTRACT

A monolithic substrate of glass or glass ceramics and methods for manufacturing are provided, where the substrate has a lightweight structure. The lightweight structure includes recesses that are delimited by webs, such webs forming tetragonal or four-corner-shaped pockets. Due to the lightweight structure, the weight of the substrate can be significantly reduced, and at the same time a high rigidity can be ensured. The substrate can be used as a mirror support or a mirror and can be employed terrestrially and/or extra-terrestrially.

23 Claims, 3 Drawing Sheets

SUBSTRATE WITH LIGHTWEIGHT STRUCTURE

CROSS REFERENCE TO RELATED APPLICATIONS

This application claims benefit under 35 U.S.C. §119(a) of German Patent Application No. 10 2011 008 953.5-51, filed Jan. 19, 2011, the entire contents of which are incorporated herein by reference.

BACKGROUND OF THE INVENTION

1. Field of the Invention

The invention relates to a monolithic substrate preferably made of glass or glass ceramics, which substrate has a lightweight structure, and relates to a method for manufacturing same. Due to its lightweight structure, the weight of the substrate can be significantly reduced, and at the same time a high rigidity can be ensured. The substrate is preferably used as a mirror or a mirror support and can be employed terrestrially and/or extra-terrestrially.

2. Description of Related Art

Large substrates having a low thermal expansion coefficient are frequently employed in astronomy, especially for large mirror telescopes. Such substrates are often used as a mirror support for attaching optical devices such as mirrors, or, after appropriate additional processing steps, are even directly used as a mirror.

The employed substrates have, e.g., circular, elliptical, hexagonal, or even honeycomb-shaped outer contours. The substrates can have diameters of about 1,000 millimeters (mm) or more. From high performance mirror telescopes, mirror supports with diameters of about 6,000 mm or more are even known.

When used as an optical device, it is important that the substrate has a high rigidity and thus only a very low tendency to deformation or alterations in geometry, to prevent unwanted optical effects, e.g. to avoid distortions.

Geometrical alterations may be caused by strong and/or rapid temperature fluctuations which may occur in an extra-terrestrial environment in satellites, or even in a terrestrial environment subjected to great temperature changes between day and night.

For this reason, the substrate often comprises glass or glass ceramics, and, in the case of glass ceramics, can comprise so-called zero-expansion materials which are characterized by an extremely low thermal expansion coefficient. In this manner it is possible to largely eliminate deformations of the substrate or alterations of its geometry caused by temperature changes.

Moreover, relevant alterations in geometry, such as sagging, may even occur due to a heavy proper weight of the substrate. For this reason, a weight reduction of the substrate is often desired.

A reduction of the weight has also to be intended for reasons of a simpler and cheaper transport, especially in case of extra-terrestrial applications. In addition, if the mirror or mirror support has a lower weight, adjustment thereof is simplified since the actuating or readjustment forces are directly related to the mass of the substrate to be moved.

Therefore, substrates have been developed which have so-called lightweight structures. To reduce weight, a part of the volume of the substrate is removed by some treatment. The treatment is often carried out on the rear face of the substrate. This allows appropriate structures to be formed, which can ensure high rigidity.

For example, recesses are known on the rear face of substrates which result in webs of a honeycomb or tubular structure. For example, DE 10 2009 005 400 A1 describes a mirror support with a lightweight structure which has recesses arranged on the rear face of the substrate, and the recesses in the bearing area are provided with a cover, for increased rigidity. Here, the covers may have the shape of the recess and can be adhered onto or into the recess.

It has been found that with the embodiment shown in DE 10 2009 005 400 A1 a high weight reduction can be achieved. However, the production of the covers and connection thereof to the substrate result in additional costs.

Other known lightweight structures are often made of composite material, and additional support components are employed.

For example, WO 2006/034 775 A1 shows a composite structure made of a zero-expansion material, comprising a mirror component and a support component that are coupled by tubular spacers which are arranged in parallel, and an adhesive is used for bonding.

EP 0395 257 A2 shows a composite structure of materials in which a honeycomb-shaped support structure made of sintered ceramic struts is used.

A use of different materials is generally not preferable because different expansion coefficients can result in local stresses in the material and thus can cause damage. Moreover, processing and subsequent joining of several components, such as by an adhesive, imply additional costs. When using an adhesive or glue, attention has to be paid to long-term stability, especially in extra-terrestrial applications.

Therefore, an object of the invention is to provide a lightweight structure for substrates, which on the one hand eliminates incorporation of additional members or support components such as spacers, struts, covers, or the like, and on the other hand exhibits an approximately equivalent mechanical stability to dynamic and static stresses.

BRIEF SUMMARY OF THE INVENTION

In particular, a small deflection of the substrate is to be ensured. At the same time a weight reduction of at least about 50% is to be achieved by the lightweight structure.

Surprisingly simple, this object is solved by providing a substantially tetragonal or four-corner-shaped lightweight structure in at least one side, preferably the rear face, of the substrate.

The invention further relates to a substrate which preferably comprises a material having a very low expansion coefficient, or a zero-expansion material. Preferably, the thermal expansion coefficient of the employed material, in a temperature range from 0 to 50 degrees Celsius, is in a range of less than $4 \times 10^{-6}$ $K^{-1}$, as is the case with borosilicate glasses, for example.

More preferably, the thermal expansion coefficient of the employed material, in a temperature range from 0 to 50 degrees Celsius, is in a range of less than $1 \times 10^{-6}$ $K^{-1}$, as is the case with quartz glasses, for example.

Most preferably, the thermal expansion coefficient of the employed material, in a temperature range from 0 to 50 degrees Celsius, is in a range of less than $0.10 \times 10^{-6}$ $K^{-1}$, as is the case with glass ceramics, for example.

Also, a material is particularly preferred which is suitable for use in an extra-terrestrial environment with temperatures in a range of up to 2.7 Kelvin (K).

In particular, glass-ceramics of the lithium aluminium silicate (LAS) system with the main constituents of lithium oxide, aluminium oxide or silicon oxide may constitute an ideal material for a substrate according to the invention. A substrate comprising such a material is excellently suited for use as a mirror or mirror support in telescopes.

Advantages in terms of mechanical stability under static and dynamic loads are obtained in the sense of the invention when the substrate consists of a monolithic block.

At least at one side, preferably the rear face, the substrate has recesses and one or more bearing point. A bearing point in the context of the invention refers to a region of the substrate that is suitable to accommodate a bearing or a fastening means.

Thus, a bearing point can be a recess or a through hole, such as a bore, which can be, for example, of cylindrical shape. In this way, the substrate can be secured using suitable retaining means.

In specific embodiments, individual bearing points are grouped into so-called main bearing points. In a typical embodiment, for example, there are three main bearing points, and each main bearing point can in turn be formed of e.g. three bearing points.

Due to the recesses at the rear face, webs are formed which delimit the recesses and function as a lightweight structure. It has been found that, in comparison to known honeycomb-shaped structures, a substantially tetragonal or four-corner-shaped structure of the recesses enables to significantly increase the rigidity against dynamic stresses.

A lightweight structure in the sense of the invention means that the recesses are delimited by webs, and that this delimitation geometrically defines a polygonal shape, the predominant part of these polygons being defined by four sides and four corners. However, this not necessarily implies that the four sides are in a geometrical form of a straight line. Rather, the sides may represent portions of a circular path or of any other closed oval curve such as an elliptical path, where this is advantageous for the shape of the substrate.

For example, in the case of cylindrically symmetric substrates, two opposite sides of the polygon may extend in parallel to the radius of the substrate, i.e. radially, whereas two other opposite sides may extend along circular paths around the center of the substrate. Such polygons form a tetragonal or four-corner-shaped structure of the recesses in the sense of the invention. This structure can be described as a semi-trapezoidal structure or a radial four-corner structure. In case of, e.g., elliptical substrates two opposite sides of the recesses may represent portions of elliptical paths.

A predominant number of the recesses form the polygonal-shaped, preferably tetragonal or four-corner-shaped, lightweight structure as described above. This means that more than 60%, preferably more than 80% of these recesses have such a shape.

Besides, other geometrical shapes of the recesses are possible in accordance with the invention, which shapes differ from the four-corner shape and which have proven suitable, in particularly if the substrate has bearing points or main bearing points. For example, recesses adjacent to these bearing points or main bearing points may take geometrical forms that differ from a four-corner shape.

Surprisingly, by virtue of the recesses a weight reduction can be achieved which is almost equivalent to that of the known honeycomb-shaped structures. Weight reduction in the context of the invention means the percentage change in weight of a treated substrate which had been provided with recesses according to the invention compared to a monolithic block of the same external geometry which is not provided with the recesses according to the invention.

The untreated substrate, i.e. the monolithic block, comprises e.g. cylindrical, circular cylindrical, elliptical, rectangular, hexagonal, or octagonal shapes, preferably in the form of discs or pillars. The lightweight structure according to the invention is particularly useful for larger substrates in the form of right cylinders, for example right cylinders having elliptical bottom and top surfaces, or in the form of right circular cylinders, or of cylindrically symmetric shape.

The substrates typically have a radius, or, in case of elliptical bottom and top surfaces, a length of the semi-major axis, in a range from about 50 mm or above. The height of the substrate may for example range from 5 mm to 500 mm.

The recesses may commonly be referred to as pockets and can be produced in various ways. By way of example, removal of material using geometrically undefined edges, such as grinding or lapping, or other known abrasive manufacturing processes can be mentioned, as well as chemical processes, such as etching.

In the case of substrate materials such as glass or glass ceramics, etching with a hydrofluoric acid containing etchant subsequently to the mechanical treatment can be of advantage for increasing strength.

By virtue of the recesses according to the present invention, a weight reduction of about more than 70% can be achieved, preferably of more than 80%, and most preferably of more than 85%.

The pockets formed by the recesses are surrounded by webs, preferably four webs for each pocket. The webs may have a wall thickness ranging from 0.5 mm to 10 mm, with wall thicknesses ranging from about 1 mm to 5 mm being preferred.

The height of the webs depends on the height of the substrate. It has been found that a height of the webs makes up more than 50%, preferably more than 70%, and most preferably more than 80% of the height of the substrate. It has further been found that lightweight structures in which the webs may have a height in a range of more than 90% of the height of the substrate can be produced with a very high stiffness. The transition zone between two webs as well as between the webs and the remaining area of the substrate typically includes processing radii.

In the case of a cylindrically symmetric substrate, two opposite webs of equal length of the pockets extend radially, while each of the two other webs which are likewise opposite to one another form a section of a respective circular path around the center. Thus, these webs are slightly curved, since they extend along a circular path.

In cylindrically symmetric substrates, two circular paths of different diameters may form an annular or circular ring which has an inner and an outer boundary zone. Within one circular ring, radially extending webs of equal length may form the lateral boundaries of the pockets. Thus, a plurality of equally sized pockets is symmetrically arranged across the area of the circular ring. The wall thickness of the circular ring approximately corresponds to the length of the opposite webs of equal length.

Similarly, in the case of elliptical substrates two elliptical paths having the same center may form an elliptical ring, thus forming an inner and an outer boundary zone. In this geometrical arrangement the tetragonal or four-corner-shaped pockets according to the invention may likewise be arranged within an elliptical ring. The pockets are delimited on the one hand by portions of the respective inner and outer elliptical paths of an elliptical ring, and on the other hand by webs in form of a straight line which extend between the inner and the outer delimiting line of the ring. The webs of a pocket may have different lengths.

In the region of the bearing points or main bearing points, the form of the pockets may differ from the four-corner shape.

This arrangement is advantageous, for example, if the recesses surrounding the bearing points are directly adjacent to the recesses of these bearing points.

Also, the substrates may have a centered or central recess, which can be, e.g., of a circular symmetrical or elliptical form, so that it also differs from a four-corner shape.

It has been found that different wall thicknesses of the circular rings or the elliptical rings are particularly suited to ensure a high stability under dynamic stresses. In a particularly suitable arrangement, the wall thicknesses in the region distant from the center are smaller than in the proximity of the center.

It is also possible for the wall thickness to vary, as viewed from the center outwards. It has been found, for example, that in an advantageous embodiment an inner ring having a larger wall thickness is arranged near the center, then another ring having a smaller wall thickness, then again a circular ring with a larger wall thickness, and further outwards a plurality of circular rings having in turn continuously decreasing wall thicknesses.

Generally, in this way a plurality of circular rings with different wall thicknesses may be arranged adjacent to one another. The number of the circular rings here depends on the number and location of the bearing points and on the radius or size of the substrate.

It has been found, for example, to be advantageous for a cylindrically symmetric substrate having three main bearing points and a radius in a range from 50 to 1,500 mm, to have a number of two to 20 circular rings of different wall thicknesses, preferably three to 15 circular rings, and more preferably 5 to 10 circular rings.

The number of pockets within one circular ring may also vary. For example, more pockets can be provided in a circular ring distant from the center than in a circular ring near the center.

It has been found that in a circular ring near the center a number of 4 to 40 pockets, preferably from 6 to 30 pockets, and more preferably from 8 to 20 pockets, and in a circular ring distant from the center a number of 10 to 100 pockets, preferably from 14 to 90 pockets, and more preferably from 18 to 80 pockets, result in a very high static and dynamic stiffness.

A number of three main bearing points has been found beneficial, these bearing points being provided on a common circular line around the center of the substrate and equidistantly spaced from each other. Preferably, this circular line is in the outer half of the radius.

In a particular embodiment, the substrate additionally has a central opening. The area of this opening can make up to 50% of the total area of the substrate.

In another particular embodiment, the substrate is additionally thinned in certain regions, and this thinning is preferably achieved at the rear face. The areas where thinning occurs, are preferably between the bearing points. The thinning may for example be determined by quadratic trial functions for the removal of a thinning, with a local coordinate system placed around the center of the thinning.

To compensate for the additional thickness reduction, the wall thicknesses of the webs can be enlarged in the areas of thickness reduction, that is, the wall thicknesses of the webs in these areas are larger than in the non-thinned areas.

Not only may the wall thicknesses of different webs be different, but the wall thickness of a single web may also vary. This is particularly advantageous in the area of the bearing points and in the peripheral areas of the substrate, for example a portion of a web near the bearing point has a larger wall thickness than a distant end of the web.

In a modification of the invention, the rear face of the substrate, i.e., the bottom of the recesses, has a convex or paraboloid form. This allows to further increase the stiffness of the substrate.

Likewise, the front face of the substrate which is free of recesses may have a convex or concave form, so that the webs will be of different height.

In another preferred embodiment of the invention, the shape of the substrate is calculated such that the substrate only has frequencies higher than 100 Hertz (Hz). This is especially advantageous for extra-terrestrial applications, since missile launches could cause low excitation frequencies which in turn could lead to deteriorations of the substrate.

By way of example, based on the lightweight structure according to the invention a cylindrically symmetrical substrate of a glass ceramic material with zero thermal expansion was produced which has a radius of about 600 mm and in which a weight reduction of about 90% could be achieved. With a substrate height of about 200 mm in this case, a maximum deformation of 1.1 micrometers ($\mu$m) and a deflection of a single pocket in a range of less than 10 nanometers (nm) was calculated.

The frequencies of such a substrate can be in a range from 300 Hz upwards, with, e.g., a first frequency of about 311 Hz and a second frequency of about 716 Hz.

Application of additional components or support elements can completely be dispensed with. So moreover, the use of other materials for producing connections between the support elements and the substrate, such as adhesives, can be avoided.

The invention relates to a mirror which comprises the substrate according of the invention and which has a reflective surface at its face opposite to the recessed face. This mirror preferably is in form of a right cylinder. It may for example be formed as a parabolic concave mirror.

Furthermore, the invention relates to a mirror support which comprises the substrate described above and which has one side, preferably the face not provided with recesses, to which mirrors can be attached.

Furthermore, the invention relates to a satellite which comprises such a mirror or mirror support Besides, the invention also relates to a use beyond the field of astronomy. For example, it is also relevant in the field of semiconductor technology, such as, e.g., for lithography equipment which comprises a substrate according to the invention with a lightweight structure.

The invention also relates to the field of machine tool engineering, such as e.g. precision tool machines comprising such substrates and subjected to very high requirements with regard to small alterations in geometry and deflections.

Furthermore, the invention also relates to apparatus or machines for highly precise measurements, such as coordinate measuring machines.

DETAILED DESCRIPTION OF THE INVENTION

The invention will now be described in more detailed based on preferred embodiments and with reference to the accompanying FIGS. 1 to 3.

Figure 1:
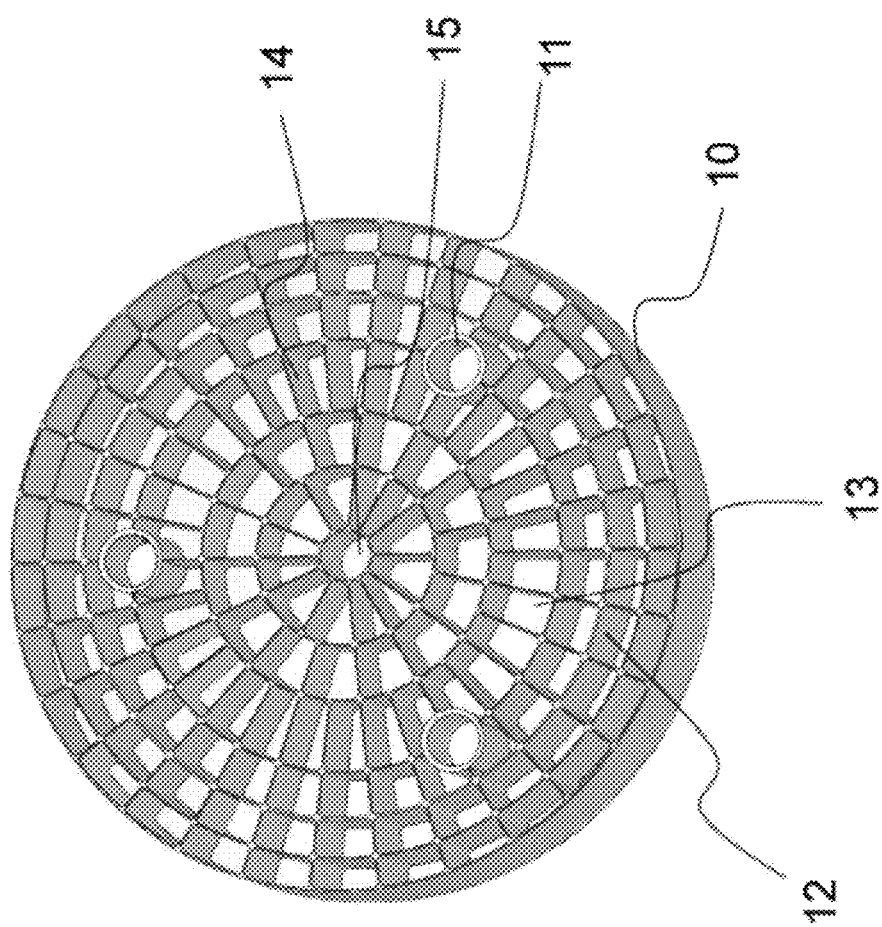
FIG. 1 is a schematic view of the rear face of an embodiment of a substrate according to an exemplary embodiment of the present disclosure.

FIG. 1 is a schematic view of the rear face of an embodiment of a substrate 10 according to the invention. In this embodiment the substrate is in a cylindrically symmetric form and has a radius of about 600 mm and a height of 200 mm.

The rear face of the substrate has bearing points as well as a plurality of tetragonal or four-corner-shaped pockets. Specifically, the substrate has a central circular recess 15 and a total of three main bearing points 11 which are also of circular shape.

Starting from the central recess, all in all six circular rings 14 are shown, each having a specific number of pockets 13. For example, the outermost circular ring has 30 pockets in total, the circular ring closest to the central recess has 15 pockets in total.

The front face of the substrate (not shown) can be flat, concave or convex, and can have a reflective surface.

Figure 2:
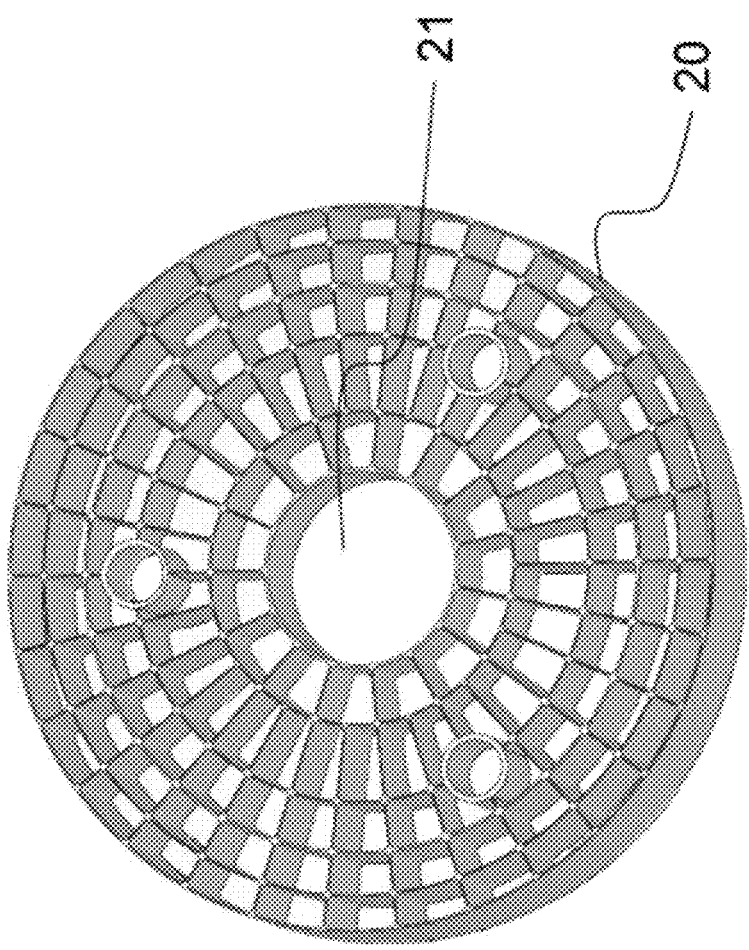
FIG. 2 is a schematic view of the rear face of an embodiment of a substrate according to the present disclosure having a central hole.

FIG. 2 shows a particular embodiment in which the substrate 20 has a central hole 21. In this exemplary embodiment the central hole has a radius of about 160 mm.

Figure 3:
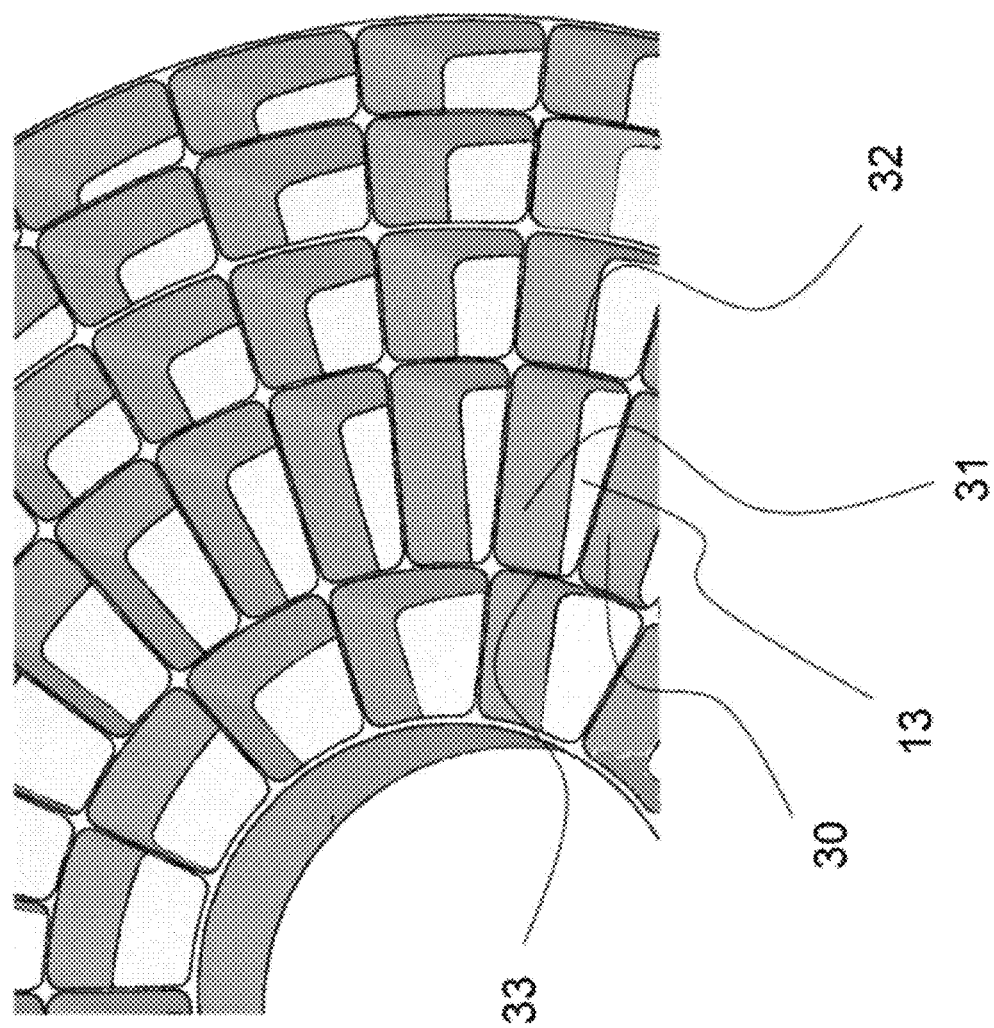
FIG. 3 is a schematic view of the rear face of another embodiment of a substrate according to the present disclosure having a recess.

FIG. 3 shows a part of the rear face of a substrate which is provided with recesses. A tetragonal or four-corner-shaped pocket 13 in the sense of the invention is formed by two opposite webs 30 and 31 of equal length, and by two webs 32 and 33 which are also opposite to each other. Here, each of the two webs 32 and 33 represents a portion of a circular path.

The webs have a wall thickness varying between 1 and 5 mm. The wall thickness of the front face, i.e. the thickness of the part of the substrate with no recesses, is about 8 mm. In this case, weight reduction is 90%.

What is claimed is:

1. A monolithic substrate for a mirror or mirror support, comprising:
   recesses in at least one face to form a lightweight structure, wherein the recesses are delimited by webs defining pockets having a polygonal shape; and
   one or more rings arranged around a center of the substrate, each of the one or more rings being delimited by an inner path and an outer path, wherein the one or more rings comprises a plurality of rings, wherein rings arranged at the center of the substrate have a wall thicknesses that is larger than a wall thickness of rings arranged at an outer part of the substrate.

2. The substrate as claimed in claim 1, wherein the substrate comprises a material having a expansion coefficient in a temperature range from 0 to 50° Celsius that is smaller than $4 \times 10^{-6}$ K$^{-1}$.

3. The substrate as claimed in claim 2, wherein the expansion coefficient is smaller than $0.10 \times 10^{-6}$ K$^{-1}$.

4. The substrate as claimed in claim 1, wherein the substrate comprises a material selected from the group consisting of glass, glass ceramic, ceramic, and metal.

5. The substrate as claimed in claim 1, wherein the substrate comprises a material selected from the group consisting of a borosilicate glass, quartz glass, and an LAS glass ceramic.

6. The substrate as claimed in claim 1, wherein the recesses and/or pockets are arranged at a rear surface of the substrate.

7. The substrate as claimed in claim 1, wherein the pockets have a convex four-corner shape having four sides, wherein the four sides can have an identical length or a different length, and wherein the four sides can have a geometrical form selected from the group consisting of a straight line, a circular arc, a section of a closed oval curve, and an elliptic curve.

8. The substrate as claimed in claim 1, wherein the recesses are hydrofluorical acid etched recesses.

9. The substrate as claimed in claim 1, wherein the recesses reduce the weight of the substrate, compared to a solid material, by about 70%.

10. The substrate as claimed in claim 1, wherein the webs delimiting the recesses have a wall thickness in a range from 0.5 mm to 10 mm.

11. The substrate as claimed in claim 1, further comprising bearing points having a feature selected from the group consisting of recesses, pockets, openings, and borings.

12. The substrate as claimed in claim 11, wherein the pockets of the bearing points have a shape differing from a polygon.

13. The substrate as claimed in claim 11, wherein the substrate has thinned areas that are not in an area of the bearing points.

14. The substrate as claimed in claim 1, wherein the substrate has a front face and a rear face and wherein the front and rear faces have a surface with a shape selected from the group consisting of a concave, convex, and paraboloic.

15. The substrate as claimed in claim 1, wherein the substrate has a shape selected from the group consisting of cylindrical, circular cylindrical, elliptical, rectangular, hexagonal, octagonal shape, and right cylindrical.

16. The substrate as claimed in claim 1, wherein the substrate comprises from 2 to 20 rings.

17. The substrate as claimed in claim 1, wherein each ring comprises a specified number of pockets.

18. The substrate as claimed in claim 17, wherein the pockets form a regular arrangement.

19. The substrate as claimed in claim 1, wherein the substrate has a central opening.

20. The substrate as claimed in claim 1, wherein the substrate has a first frequency that is higher than 100 Hz.

21. The substrate as claimed in claim 1, wherein the substrate finds use as a device selected from the group consisting of a mirror, a mirror support, a satellite mirror, a satellite mirror support, a precision tool machine, and a coordinate measuring machine.

22. A method for manufacturing a substrate from glass or glass ceramics having recesses on one side that form rectangular pockets, comprising the steps of:
   providing a glass or glass ceramic plate; and
   forming recesses and bearing points in a rear face of the plate, wherein the step of forming recesses comprises leaving webs that are portions of a circular path or of a closed oval curved path to define the recesses in the shape of plurality of rings around a center of the substrate, each of the one or more rings being delimited by an inner path and an outer path, wherein the one or more rings comprises a plurality of rings, wherein rings arranged at the center have a wall thicknesses that is larger than a wall thickness of rings arranged at an outer part of the substrate.

23. The method as claimed claim 22, wherein the step of forming recesses and bearing points comprises removing more than 70% of the material of the glass or glass ceramic plate.

* * * * *